(12) United States Patent
Zhang et al.

(10) Patent No.: US 12,429,323 B1
(45) Date of Patent: Sep. 30, 2025

(54) INVOLUTE GEAR PROFILE ARTIFACT FOR LARGE GEAR TRACEABLE METROLOGY

(71) Applicant: XI'AN TECHNOLOGICAL UNIVERSITY, Xi'an (CN)

(72) Inventors: Jialin Zhang, Xi'an (CN); Jianhua Wang, Xi'an (CN); Peili Yin, Xi'an (CN); Shaokang Li, Xi'an (CN); Bingqing Jiang, Xi'an (CN); Zhen Xu, Xi'an (CN); Yadong Zhang, Xi'an (CN); Yunbo Shen, Xi'an (CN); Dongfeng He, Xi'an (CN); Xiaoli Wang, Xi'an (CN); Xiaodong Chen, Xi'an (CN); Qiang Zhu, Xi'an (CN)

(73) Assignee: XI'AN TECHNOLOGICAL UNIVERSITY, Xi'an (CN)

( * ) Notice: Subject to any disclaimer, the term of this patent is extended or adjusted under 35 U.S.C. 154(b) by 0 days.

(21) Appl. No.: 19/235,650

(22) Filed: Jun. 12, 2025

Related U.S. Application Data

(63) Continuation of application No. PCT/CN2025/084596, filed on Mar. 25, 2025.

(30) Foreign Application Priority Data

Mar. 29, 2024 (CN) .......................... 202410375043.1

(51) Int. Cl.
*G01B 5/20* (2006.01)
*F16H 55/08* (2006.01)

(52) U.S. Cl.
CPC ......... *G01B 5/202* (2013.01); *F16H 55/0806* (2013.01)

(58) Field of Classification Search
CPC ............................. G01B 5/202; F16H 55/0806
(Continued)

(56) References Cited

U.S. PATENT DOCUMENTS 3,247,736 A * 4/1966 Roth .................... F16H 55/0806
74/462
3,631,603 A * 1/1972 Munro ...................... G01B 7/28
33/553
(Continued)

FOREIGN PATENT DOCUMENTS

CN 104655080 A 5/2015
CN 106482690 A 3/2017
(Continued)

OTHER PUBLICATIONS

ISO 18653-2003: Gears-Evaluation of instruments for the measurement of individual gears, 2003, pp. 1-19, Switzerland: International Organization for Standardization.
(Continued)

*Primary Examiner* — George B Bennett
(74) *Attorney, Agent, or Firm* — Bayramoglu Law Offices LLC

(57) ABSTRACT

An involute gear profile artifact for large gear traceable metrology includes six surfaces, including an involute gear profile cylindrical surface for parameter transfer, a datum bottom surface and a datum top surface that are symmetrically arranged on upper and lower sides, a root datum surface and a tip datum surface that are arranged in parallel on front and rear sides, and an alignment datum surface oppositely arranged relative to the involute gear profile cylindrical surface; and a distance from the root datum surface to a corresponding base circle center is a design distance D. The artifact can meet the traceability requirements of the values of the large gear. The artifact makes up for the lack of standard measuring instrument in a traceable metrology system for a large-diameter involute gear, and improves a value traceability system for the large gear with a diameter greater than 500 mm.

8 Claims, 3 Drawing Sheets

(58) Field of Classification Search
USPC ... 33/501.7, 501.11, 501.12, 501.13, 501.14, 33/501.16
See application file for complete search history.

(56) References Cited

U.S. PATENT DOCUMENTS

| | | | | |
|---|---|---|---|---|
| 3,732,626 | A * | 5/1973 | Miller, Jr. | G01B 5/20 33/501.12 |
| 3,765,303 | A * | 10/1973 | Fischer | F16H 55/0806 29/893.35 |
| 4,185,391 | A * | 1/1980 | Roley | G01B 5/202 33/501.7 |
| 4,294,132 | A * | 10/1981 | Matusz | F16H 55/0806 74/462 |
| 4,769,917 | A * | 9/1988 | Bertz | G01B 5/202 33/DIG. 1 |
| 4,962,590 | A * | 10/1990 | Ambrose | G01M 13/021 33/501.14 |
| 5,461,797 | A * | 10/1995 | Royer | G01B 5/202 33/501.7 |
| 5,868,643 | A * | 2/1999 | Teraoka | F16H 48/285 475/252 |
| 6,205,879 | B1 * | 3/2001 | Litvin | F16H 55/088 74/462 |
| 7,581,695 | B2 * | 9/2009 | Gasparini | F16H 55/088 74/462 |
| 7,748,131 | B2 * | 7/2010 | Finkenwirth | B23F 23/1218 33/501.13 |
| 10,710,185 | B2 * | 7/2020 | Leicht | B23F 19/10 |
| 10,753,730 | B2 * | 8/2020 | Mies | G01B 11/306 |
| 11,268,800 | B2 * | 3/2022 | Van Hauth | B23F 1/06 |
| 12,007,011 | B2 * | 6/2024 | Piazza | F02C 7/36 |
| 12,135,208 | B2 * | 11/2024 | Ling | G01B 5/202 |
| 2020/0096306 | A1 * | 3/2020 | Galestien | G01B 5/202 |
| 2022/0009044 | A1 * | 1/2022 | Yoshihiro | B23P 15/14 |

FOREIGN PATENT DOCUMENTS

| | | |
|---|---|---|
| CN | 108061651 A | 5/2018 |
| CN | 111521086 A | 8/2020 |
| CN | 116592807 A | 8/2023 |

OTHER PUBLICATIONS

Frank Härtig, et al., Standard conforming involute gear metrology using an articulated arm coordinate measuring system, Measurement Science and Technology, 2012, pp. 1-6, vol. 23. No. 105011.

Ann-Kathrin Wiemann, et al., Traceable metrology for large involute gears, Precision Engineering, 2019, pp. 330-338, vol. 55.

* cited by examiner

INVOLUTE GEAR PROFILE ARTIFACT FOR LARGE GEAR TRACEABLE METROLOGY

CROSS REFERENCE TO THE RELATED APPLICATIONS

This application is the continuation application of International Application No. PCT/CN2025/084596, filed on Mar. 25, 2025, which is based upon and claims priority to Chinese Patent Application No. 202410375043.1, filed on Mar. 29, 2024, the entire contents of which are incorporated herein by reference.

TECHNICAL FIELD

The present invention belongs to the technical field of precision gear metrology, specifically relates to an involute gear profile artifact for large gear traceable metrology.

BACKGROUND

Large gears are critical transmission components in large equipment. With the wide application of the large gears in ships, heavy-lift helicopters, renewable energy equipment, and other fields and growing market demands, requirements on performance and quality of the large gears have become increasingly stringent. Large gear measurement, as a key link to ensure that the gear meets performance requirements, plays a pivotal role in ensuring the normal operation and a long service life of the machinery and equipment.

High-precision measurement of the large gears is typically performed through off-machine measurement (with Coordinate Measuring Machine and Gear Measuring Center), on-machine measurement, or near-machine measurement. Due to differences in instrument structures and tolerance sources, measurement results vary across the methods, and measured values cannot be certified by each other. To achieve the unification of involute gear profile values, it is usually necessary to use the involute artifact as a physical artifact of the involute for value traceability, traceable metrology, and value comparison of an involute gear profile deviation.

Generally, the involute artifact is certified by the National Institute of Metrology and a corresponding calibration value is given. The gear measuring instrument is calibrated by using the certified involute artifact, and the gear instrument can only measure the gear after the calibration and correction of the standard involute artifact. In addition, for artifact specifications for the calibration of high-precision gear profile measuring instrument, it is proposed in ISO 18653: 2003 that "when calibrating gear measuring instrument, a base circle radius of the involute artifact shall be greater than 50% of a measurement range of the instrument being calibrated". However, at present, the base circle radius of the most widely used involute artifacts in the industry is less than 200 mm, and it is not in line with the standard to use the artifact with a small base circle radius to calibrate the large gear measuring instrument.

Internationally, in 2010, to address the urgent need for wind turbine gear measurement, the German National Metrology Institute (Physikalisch-Technische Bundesanstalt (PTB)) developed a 50° fan-shaped gear artifact, with a tip diameter of 1000 mm, an artifact weight of 450 kg, a normal modulus of 20 mm, a pressure angle of 20°, and a gear width of 400 mm. The artifact involved a 10° right-handed gear, a 20° left-handed gear, and a spur gear, used for involute and helix traceability and the calibration of gears with a diameter of 1000 mm. The artifact needs to be used with a counterweight during industrial calibration.

In 2018, the German PTB unveiled the world's largest ring-gear involute artifact, with a base circle diameter of about 2000 mm and a weight of 2.7 tons (globally unique). Due to large dimensions of the large-gear involute artifact, the adjustment during transportation and use is inconvenient, and the artifact precision is sensible to temperature fluctuations and supporting conditions (restricted to laboratory use).

The invention patent (CN201610847011.2) discloses a large-gear involute artifact composed of an involute artifact block and a fan-shaped base circle block. The large-gear involute artifact specifically targets a base circle radius of $r_b$ >400 mm, including an involute artifact block, a fan-shaped base circle block, an auxiliary support ball-head screw, a positioning pin, and a connecting screw, to calibrate the measurement precision of an involute gear profile deviation of the gear measuring instrument. However, theoretically, the mechanical structure can operate without a mandrel. With an increase in the transmitted base circle radius, the dimensions also need to be increased, and there is still a problem of the foregoing solution in the use and manufacturing, so this is only a concept, and there is no industrial application on the market.

In summary, through the analysis of the structure of the existing involute artifact with a large base circle radius, it is learned that core geometric elements of the involute artifact are the involute gear profile surface and the base circle center, and the mechanical structural entity of the artifact is a structure designed to ensure a relative position between the base circle center and a high-precision involute gear profile cylindrical surface. The fan-shaped involute gear artifact characterizes the base circle center through a reference hole, and ensures the precise position of the involute gear profile surface relative to the base circle center through a fan-shaped physical part. The ring-gear artifact uses a high-precision cylindrical surface to characterize the base circle center, and the ring-gear structure is used to ensure the position of each measured gear surface relative to the base circle center.

Constrained by the mechanical structure of the physical artifact, a volume and a weight of the physical structure are inevitably increase greatly with the increase in the transmitted base circle radius, resulting in difficulty in the manufacturing of the artifact, in ensuring the precision stability, and in use comparison. In addition, the involute artifact with a large base circle radius needs to be used as a physical artifact for value comparison, and requires frequent transportation among national metrology institutes, laboratories, and enterprises. However, the large structure of the artifact present significant transport challenges, while thermal and load variations inevitably compromise the shape precision. Due to the lack of the involute artifact with a large base circle radius that has a light structure and good precision stability, and is easy to use for comparison, the traceable metrology system of the large-diameter involute gear profile cannot be established, and measurement results of the large gear cannot be traced, to further hinder the improvement in manufacturing the large gear (with a diameter greater than 500 mm).

SUMMARY

The present invention provides an involute gear profile artifact for large gear traceable metrology, to overcome the problem in the prior art that the structure is huge, the precision stability is difficult to maintain, and the structure is not suitable for value comparison, resulting in failure in establishing the traceable metrology system of the large-diameter involute gear profile.

To achieve the objective of the present invention, a solution of the present invention is that: an involute gear profile artifact for large gear traceable metrology is provided, including six surfaces, including an involute gear profile cylindrical surface for parameter transfer, a datum bottom surface and a datum top surface that are symmetrically arranged on upper and lower sides, a root datum surface and a tip datum surface that are arranged in parallel on front and rear sides, and an alignment datum surface oppositely arranged relative to the involute gear profile cylindrical surface; and a distance from the root datum surface to a corresponding base circle center is a design distance D.

Further, there are two oppositely arranged involute gear profile cylindrical surfaces, and the two surfaces take the alignment datum surface as a symmetrical surface.

Moreover, a size of the transmitted base circle radius of the artifact is equivalent to a size of a corresponding measured standard gear, and a calculated length of the artifact includes a starting point and an end point of the corresponding standard gear, and is 1.5-2 times of an involute length of the corresponding standard gear.

Furthermore, the thickness of the datum bottom surface and the datum top surface is 10 mm-20 mm, and the gear surface extends 2 mm-3 mm to the base circle along an involute tangent at the base circle.

In addition, spatial positioning of the artifact is determined by the datum surface of the artifact, the flatness of the datum bottom surface and the datum top surface that are symmetrically arranged on the upper and lower sides is not more than 0.5 μm, and the surface roughness Ra is not more than 0.2 μm; the root datum surface and the tip datum surface that are arranged in parallel on the front and rear sides are positioning surfaces of the artifact, the flatness is not more than 0.5 μm, the perpendicularity with the datum bottom surface is not more than 0.5 μm, and the surface roughness Ra is not more than 0.2 μm; the shape tolerance of the involute gear profile cylindrical surface 1 is not more than 3.0 μm, and the surface roughness Ra is not more than 0.2 μm; and the flatness of the alignment datum surface 6 is not more than 0.2 μm, the perpendicularity with the datum bottom surface 2 is not more than 0.4 m, and the surface roughness Ra is not more than 0.2 μm.

Compared with the prior art, the present invention has the following advantages.

1. The present invention provides an involute gear profile artifact with a large base circle radius. The design idea of ensuring a relative position of an involute gear profile and a base circle center by a bulky mechanical structural entity is replaced, and the artifact only has the same size as a tooth of a gear, and does not increase with the increase of the base circle radius. The transmitted value can be determined based on the size of the base circle parameter of the measured gear, to help reduce calibration tolerance and ensure more reliable traceable metrology.

2. The base circle radius of the involute gear profile artifact with the large base circle radius provided in the present invention can exceed the specification of a maximum diameter of 2000 mm of the base circle of the existing gear artifact. In addition, due to a small structure size and less manufacturing difficulty, the manufacturing precision can be equivalent to that of small and medium-sized involute artifacts, and the artifact can meet the value traceability requirements for large gear measurement.

3. The dimensions of the artifact provided in the present invention are small, so the artifact is not sensitive to the temperature changes, and is convenient for value comparison among national metrology institutes, laboratories, and enterprises. The shape precision of the artifact is not affected by the environment, temperature and load during transportation, and the artifact has high precision stability, to help reduce the uncertainty of traceable metrology.

4. The involute gear profile artifact provided in the present invention makes up for the lack of standard measuring instrument in a traceable metrology system for a large-diameter involute gear, and improves a value traceability system for the large gear with a diameter greater than 500 mm.

5. The present invention has advantages of a simple structure, a simple measurement method, and high measurement precision, making it suitable for the calibration of high-precision large gear measuring instrument, and is convenient for transportation, installation, and adjustment, to ensure great market potential and broad application value.

Figure 1:
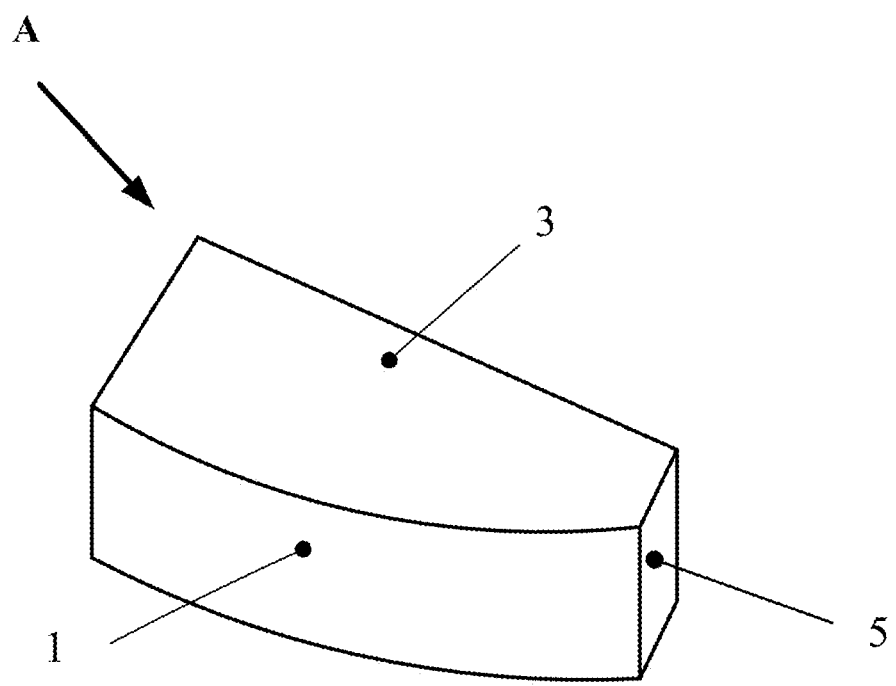
FIG. 1 is a diagram of an overall structure of an artifact according to Embodiment 1.

Reference numerals are as follows:
1—involute gear profile cylindrical surface; 2—datum bottom surface; 3—datum top surface; 4—root datum surface; 5—tip datum surface; 6—alignment datum surface; 7—reference plane of the root datum surface; 8—reference plane of the datum bottom surface; and 9—reference plane of the alignment datum surface.

DETAILED DESCRIPTION OF THE EMBODIMENTS

The following describes methods of the present invention in detail with reference to accompanying drawings.

Figure 2:
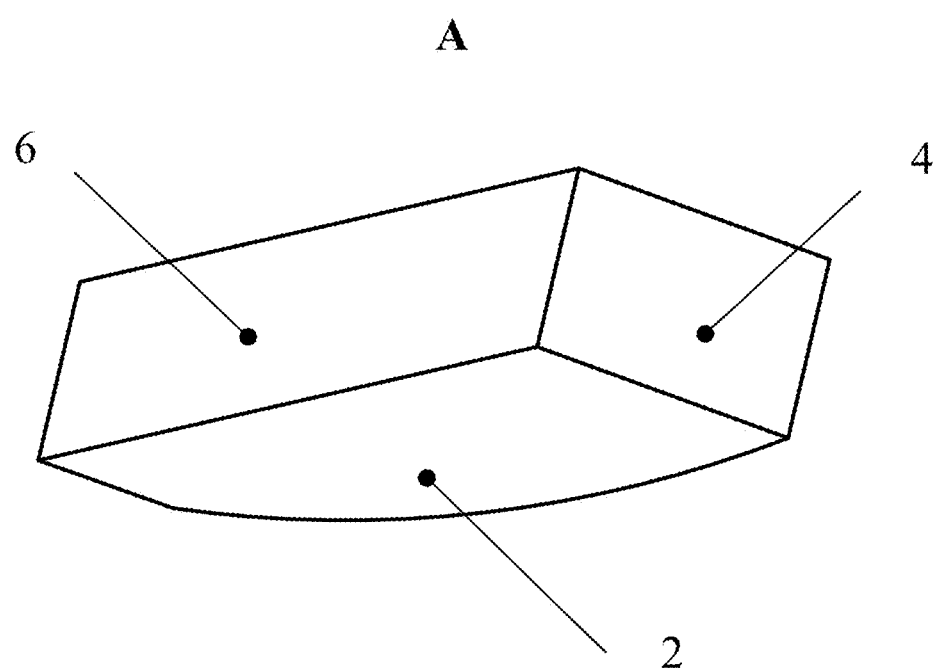
FIG. 2 is an axonometric view of FIG. 1 along A direction.

Embodiment 1: refer to FIG. 1 and FIG. 2: an involute gear profile artifact with a large base circle radius is provided, including an involute cylindrical surface 1 for parameter transfer, a datum bottom surface 2 and a datum top surface 3 that are symmetrically arranged on upper and lower sides, a root datum surface 4 and a tip datum surface 5 that are arranged in parallel on front and rear sides, and an alignment datum surface 6 oppositely arranged relative to the involute gear profile cylindrical surface 1. The involute shape of the gear profile artifact depends on the size of the base circle, so the involute gear profile artifact provided in the present invention introduces a parameter of a position of a base circle center as a characteristic parameter of the artifact. That is, a distance from the root datum surface 4 of the artifact to the corresponding base circle center is a design distance D, to characterize this parameter.

Figure 3:
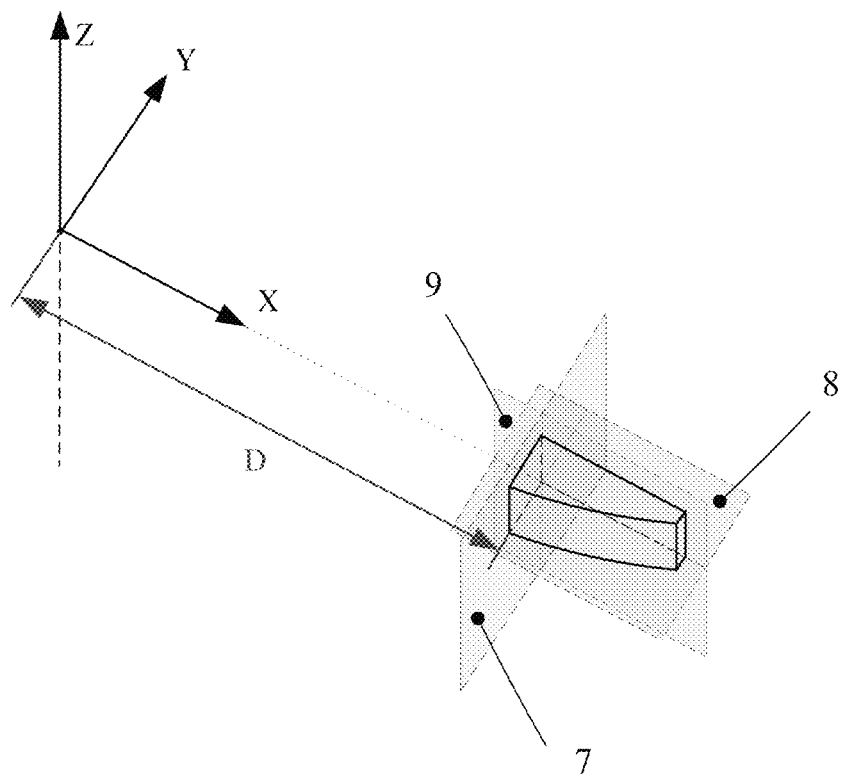
FIG. 3 is a diagram of a positioning datum surface of an artifact according to Embodiment 1.

Refer to FIG. 3: based on the structure, the present invention provides three mutually perpendicular planes: a reference plane 7 of the root datum surface, a reference plane 8 of the datum bottom surface, and a reference plane 9 of the alignment datum surface.

Figure 4:
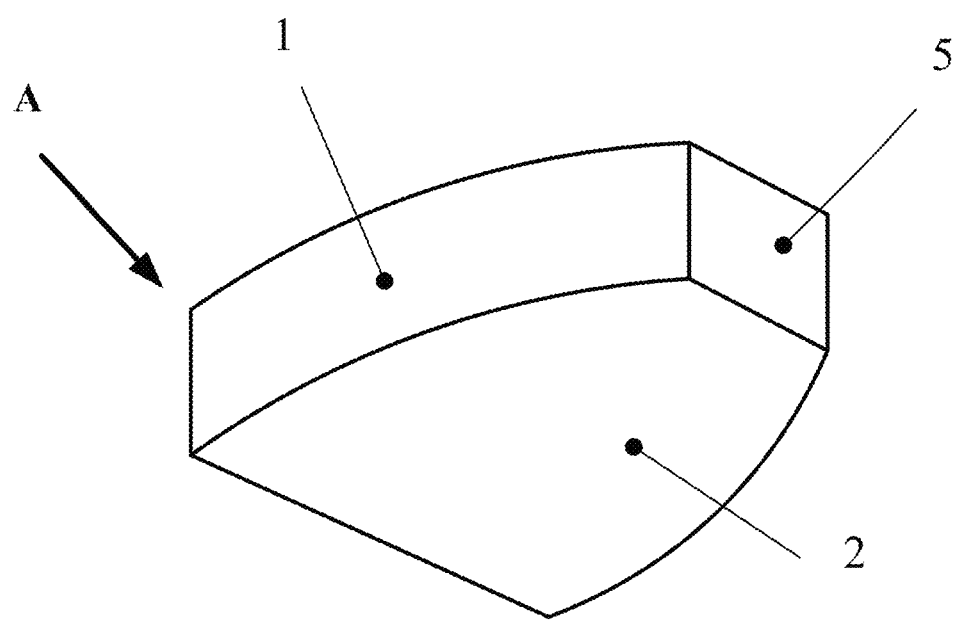
FIG. 4 is a diagram of an overall structure of an artifact according to Embodiment 2.
Figure 5:
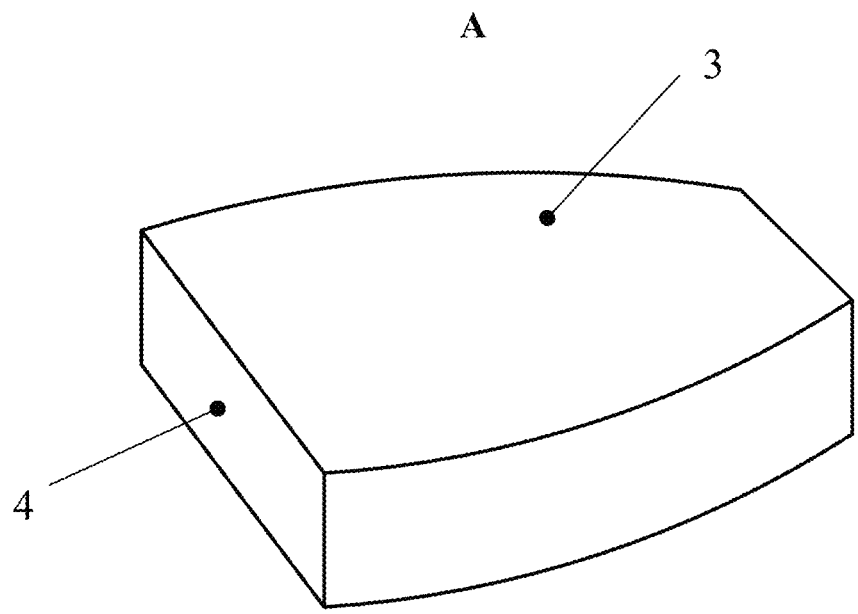
FIG. 5 is an axonometric view of FIG. 4 along A direction.

Embodiment 2: refer to FIG. 4 and FIG. 5: an involute gear profile artifact with a large base circle radius is provided, and the alignment datum surface 6 is a symmetrical surface. The artifact provided in this Embodiment includes two oppositely arranged involute gear profile cylindrical surfaces 1, a datum bottom surface 2 and a datum top surface 3 that are symmetrically arranged on upper and lower sides, and a root datum surface 4 and a tip datum surface 5 that are arranged in parallel on front and rear sides. The involute shape of the gear profile artifact depends on the size of the base circle, so the involute gear profile artifact provided in the present invention introduces a parameter of a position of a base circle center as a characteristic parameter of the artifact. That is, a distance from the root datum surface 4 of the artifact to the corresponding base circle center is a design distance D, to characterize this parameter.

Figure 6:
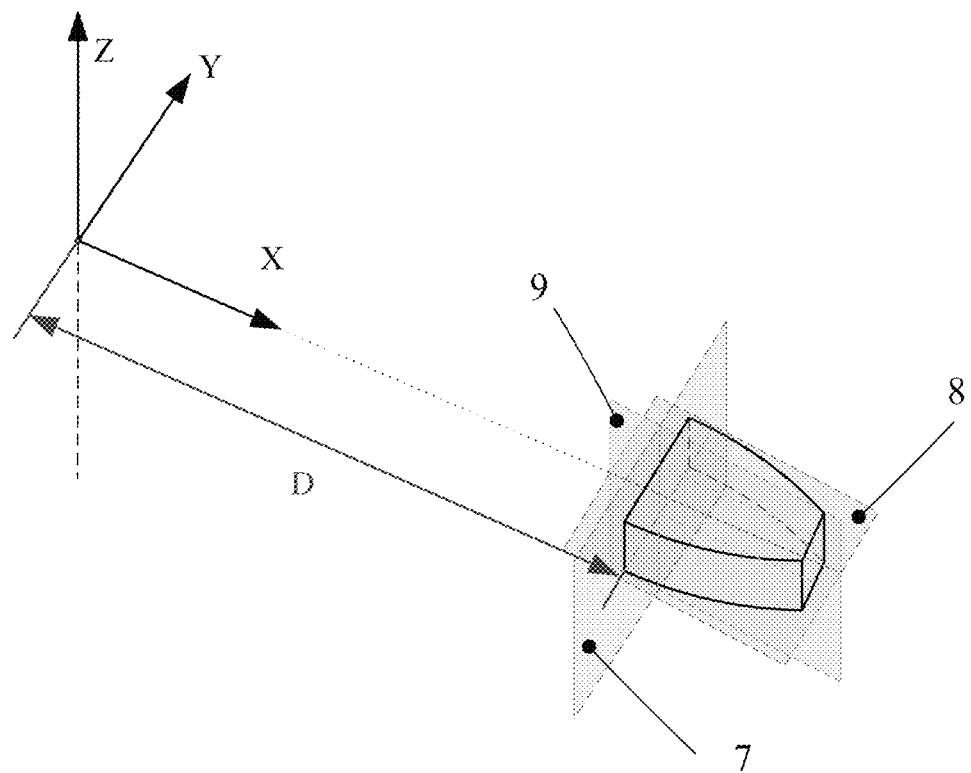
FIG. 6 is a diagram of a positioning datum surface of an artifact according to Embodiment 2.

Refer to FIG. 6: based on the structure, the present invention provides three mutually perpendicular planes: a reference plane 7 of the root datum surface, a reference plane 8 of the datum bottom surface, and a reference plane 9 of the alignment datum surface.

In Embodiment 1 and Embodiment 2, a size of the transmitted base circle radius of the artifact is equivalent to a size of a corresponding measured standard gear, and a calculated length of the artifact includes a starting point and an end point of the corresponding standard gear, and is 1.5-2 times of an involute length of the corresponding standard gear.

The thickness of the datum bottom surface and the datum top surface is 10 mm-20 mm, and the gear surface extends 2 mm-3 mm to the base circle along an involute tangent at the base circle, to prevent the loss of the involute expansion length caused by the chamfering or the processing collapse angle of the root of the involute artifact.

Spatial positioning of the artifact is determined by the datum surface of the artifact, the flatness of the datum bottom surface 2 and the datum top surface 3 that are symmetrically arranged on the upper and lower sides is not more than 0.5 μm, and the surface roughness Ra is not more than 0.2 μm; and the root datum surface 4 and the tip datum surface 5 that are arranged in parallel on the front and rear sides are positioning surfaces of the artifact, the flatness is not more than 0.5 μm, the perpendicularity with the datum bottom surface 2 is not more than 0.5 μm, and the surface roughness Ra is not more than 0.2 μm. The shape tolerance of the involute gear profile cylindrical surface 1 is not more than 3.0 μm, and the surface roughness Ra is not more than 0.2 μm; and the flatness of the alignment datum surface 6 is not more than 0.2 μm, the perpendicularity with the datum bottom surface 2 is not more than 0.4 μm, and the surface roughness Ra is not more than 0.2 μm.

For different measuring instruments, measurement methods of the large gear mainly include Generating method, Polar coordinate method, and Cartesian coordinate method. Two different cases are described below to describe a specific method for using the involute gear profile artifact for large gear traceable metrology according to the present invention.

(1) When Generating method and Polar coordinate method are used for measurement, three mutually perpendicular planes of the artifact: a reference plane 7 of the root datum surface, a reference plane 8 of the datum bottom surface, and a reference plane 9 of the alignment datum surface are parallel to a coordinate system established by a measurement system at a rotation center origin. A position of the base circle center corresponding to the artifact is adjusted to coincide with the rotation center origin of the measurement system, and the distance from the root datum surface 4 to the rotation center of the measurement system is the design distance D, to ensure correct positioning of the artifact. After the position of the artifact is determined, the artifact rotates with a workbench, a probe of the large gear measuring instrument follows to move, to measure a gear profile deviation of an involute gear profile, and performance of measuring the gear surface deviation by the instrument is evaluated based on the gear profile deviation, to realize traceability of a base circle radius.

(2) When Cartesian coordinate method is used for measurement, three mutually perpendicular planes of the artifact: a reference plane 7 of the root datum surface, a reference plane 8 of the datum bottom surface, and a reference plane 9 of the alignment datum surface are parallel to a coordinate system established by a measurement system at a rotation center origin. A position of the base circle center corresponding to the artifact is adjusted to coincide with the rotation center origin of the measurement system, and the distance from the root datum surface 4 to the rotation center of the measurement system is the design distance D, to ensure correct positioning of the artifact. After the position is determined, the artifact remains stationary, and only a probe of the large gear measuring instrument moves to measure a gear profile deviation of an involute gear profile at any position. After a first position is measured, a workbench is rotated to drive the artifact to rotate at any angle and measurement is performed again. Steps are repeated, and at least two positions are measured, to evaluate performance of measuring the gear profile deviation by the instrument based on comprehensive measurement results, to realize traceability of a base circle radius.

Before use, in a constant temperature environment of 20±1° C., dedicated equipment is used to accurately measure the involute gear profile artifact, and determine the base circle radius $r_{b0}$ of the involute gear profile artifact, with precision to 0.1 μm. If the involute gear profile deviation of the involute gear profile artifact is not zero during measurement, the deviation can be compensated into the base circle radius $r_{b0}$, and the compensated $r_b$ is used as a base circle information parameter of the large-gear involute artifact, that is, a calibration value of the artifact.

The above descriptions are mere technical methods and implementations of the present invention, but is not intended to limit the protection scope of the present invention. Any equivalent replacements or changes made by a person skill in the art according to the technical solutions and the inventive concepts of the present invention shall fall within the protection scope of the present invention.

The invention claimed is:

1. A method for using an involute gear profile artifact for large gear traceable metrology, wherein the involute gear profile artifact for large gear traceable metrology comprises:
    an involute gear profile cylindrical surface for parameter transfer,
    a datum bottom surface and a datum top surface, wherein the datum bottom surface and the datum top surface are symmetrically arranged on upper and lower sides,
    a root datum surface and a tip datum surface, wherein the root datum surface and the tip datum surface are arranged in parallel on front and rear sides, and
    an alignment datum surface oppositely arranged relative to the involute gear profile cylindrical surface;

wherein a distance from the root datum surface to a corresponding base circle center is a design distance D;

for different measuring instruments, measurement methods of a large gear comprise Generating method, Polar coordinate method, and Cartesian coordinate method; and when the Generating method and the Polar coordinate method are used for measurement, three mutually perpendicular planes of the involute gear profile artifact: a reference plane of the root datum surface, a reference plane of the datum bottom surface, and a reference plane of the alignment datum surface are parallel to a coordinate system established by a measurement system at a rotation center origin; a position of the base circle center corresponding to the involute gear profile artifact is adjusted to coincide with the rotation center origin of the measurement system, and a distance from the root datum surface to the rotation center origin of the measurement system is the design distance D, to ensure correct positioning of the involute gear profile artifact; and after a position of the involute gear profile artifact is determined, the involute gear profile artifact rotates with a workbench, a probe of a large gear measuring instrument follows to move, to measure a gear profile deviation of an involute gear profile, and performance of measuring a gear surface deviation by the large gear measuring instrument is evaluated based on the gear profile deviation, to realize traceability of a base circle radius; or when the Cartesian coordinate method is used for measurement, three mutually perpendicular planes of the involute gear profile artifact: a reference plane of the root datum surface, a reference plane of the datum bottom surface, and a reference plane of the alignment datum surface are parallel to a coordinate system established by a measurement system at a rotation center origin; a position of the base circle center corresponding to the involute gear profile artifact is adjusted to coincide with the rotation center origin of the measurement system, and a distance from the root datum surface to the rotation center origin of the measurement system is the design distance D, to ensure correct positioning of the involute gear profile artifact; after the position is determined, the involute gear profile artifact remains stationary, and only a probe of a large gear measuring instrument moves to measure a gear profile deviation of an involute gear profile at any position; after a first position is measured, a workbench is rotated to drive the involute gear profile artifact to rotate at any angle and measurement is performed again; and steps are repeated, and at least two positions are measured, to evaluate performance of measuring the gear profile deviation by the large gear measuring instrument based on comprehensive measurement results, to realize traceability of a base circle radius.

2. The method according to claim 1, wherein two involute gear profile cylindrical surfaces are oppositely arranged, and the two involute gear profile cylindrical surfaces take the alignment datum surface as a symmetrical surface.

3. The method according to claim 1, wherein a size of the base circle radius of the involute gear profile artifact is equivalent to a size of a corresponding measured standard gear, and a calculated length of the involute gear profile artifact comprises a starting point and an end point of the corresponding standard gear, and is 1.5-2 times of an involute length of the corresponding standard gear.

4. The method according to claim 3, wherein a thickness of the datum bottom surface and the datum top surface is 10 mm-20 mm, and a gear surface extends 2 mm-3 mm to a base circle along an involute tangent at the base circle.

5. The method according to claim 4, wherein spatial positioning of the involute gear profile artifact is determined by the datum bottom surface, the datum top surface, the root datum surface and the tip datum surface of the involute gear profile artifact, wherein the datum bottom surface and the datum top surface have a flatness of less than or equal to 0.5 μm, and a surface roughness Ra of less than or equal to 0.2 μm; the root datum surface and the tip datum surface are positioning surfaces of the involute gear profile artifact, and have a flatness of less than or equal to 0.5 μm, a perpendicularity with the datum bottom surface of less than or equal to 0.5 μm, and a surface roughness Ra of less than or equal to 0.2 μm; the involute gear profile cylindrical surface has a shape tolerance of less than or equal to 3.0 μm, and a surface roughness Ra of less than or equal to 0.2 μm; and the alignment datum surface has a flatness of less than or equal to 0.2 μm, a perpendicularity with the datum bottom surface of less than or equal to 0.4 μm, and a surface roughness Ra of less than or equal to 0.2 μm.

6. The method according to claim 2, wherein a size of the base circle radius of the involute gear profile artifact is equivalent to a size of a corresponding measured standard gear, and a calculated length of the involute gear profile artifact comprises a starting point and an end point of the corresponding standard gear, and is 1.5-2 times of an involute length of the corresponding standard gear.

7. The method according to claim 6, wherein a thickness of the datum bottom surface and the datum top surface is 10 mm-20 mm, and a gear surface extends 2 mm-3 mm to a base circle along an involute tangent at the base circle.

8. The method according to claim 7, wherein spatial positioning of the involute gear profile artifact is determined by the datum bottom surface, the datum top surface, the root datum surface and the tip datum surface of the involute gear profile artifact, wherein the datum bottom surface and the datum top surface have a flatness of less than or equal to 0.5 μm, and a surface roughness Ra of less than or equal to 0.2 μm; the root datum surface and the tip datum surface are positioning surfaces of the involute gear profile artifact, and have a flatness of less than or equal to 0.5 μm, a perpendicularity with the datum bottom surface of less than or equal to 0.5 μm, and a surface roughness Ra of less than or equal to 0.2 μm; the involute gear profile cylindrical surface has a shape tolerance of less than or equal to 3.0 μm, and a surface roughness Ra of less than or equal to 0.2 μm; and the alignment datum surface has a flatness of less than or equal to 0.2 μm, a perpendicularity with the datum bottom surface of less than or equal to 0.4 μm, and a surface roughness Ra of less than or equal to 0.2 μm.

* * * * *